May 11, 1943.  A. J. NOEL  2,318,619
MULTIPLE SPINDLE DRILL PRESS
Filed Aug. 1, 1940   4 Sheets-Sheet 3

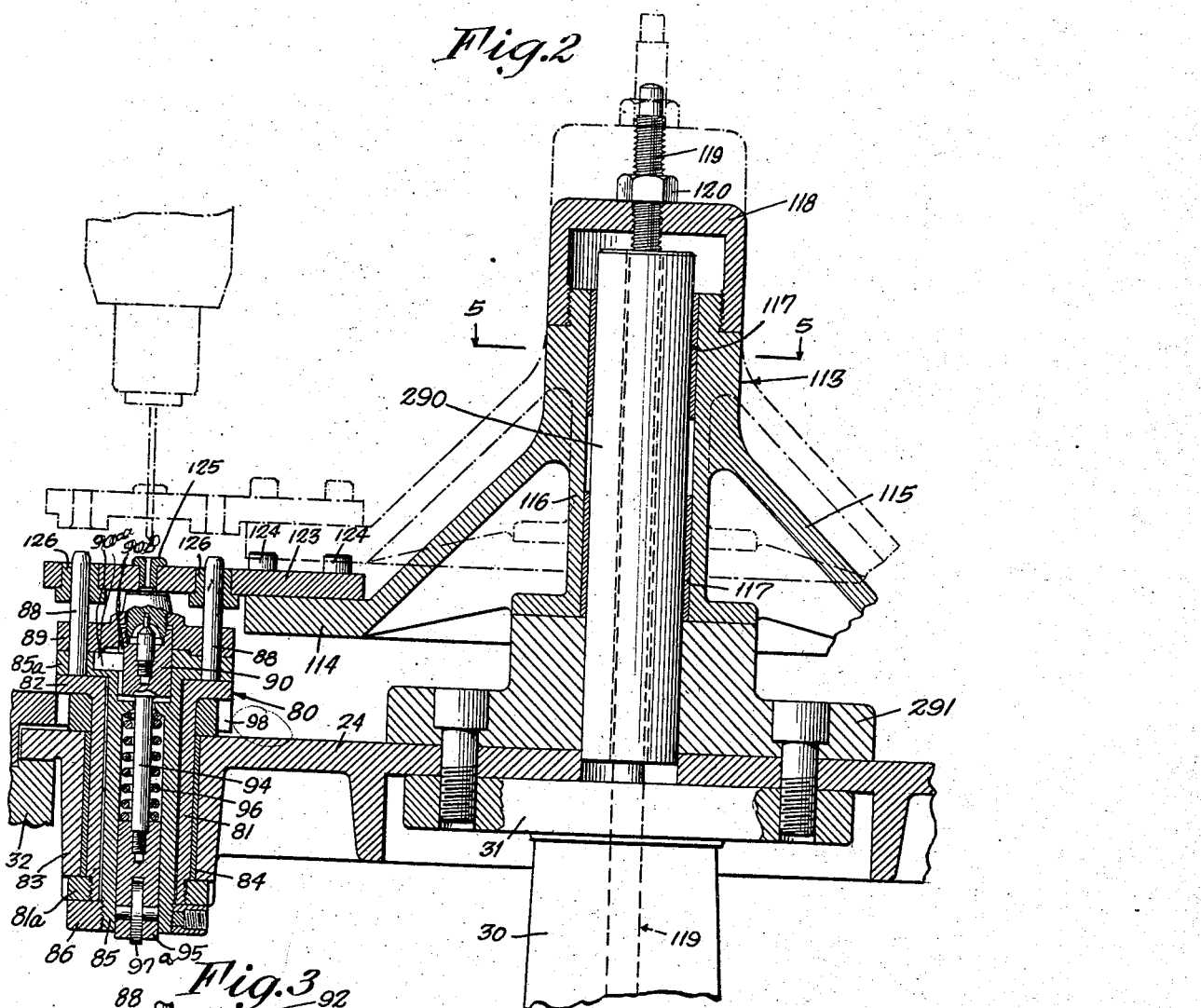

INVENTOR
Alfred J. Noel
BY
ATTORNEYS

May 11, 1943.                    A. J. NOEL                        2,318,619
                        MULTIPLE SPINDLE DRILL PRESS
                          Filed Aug. 1, 1940            4 Sheets-Sheet 4
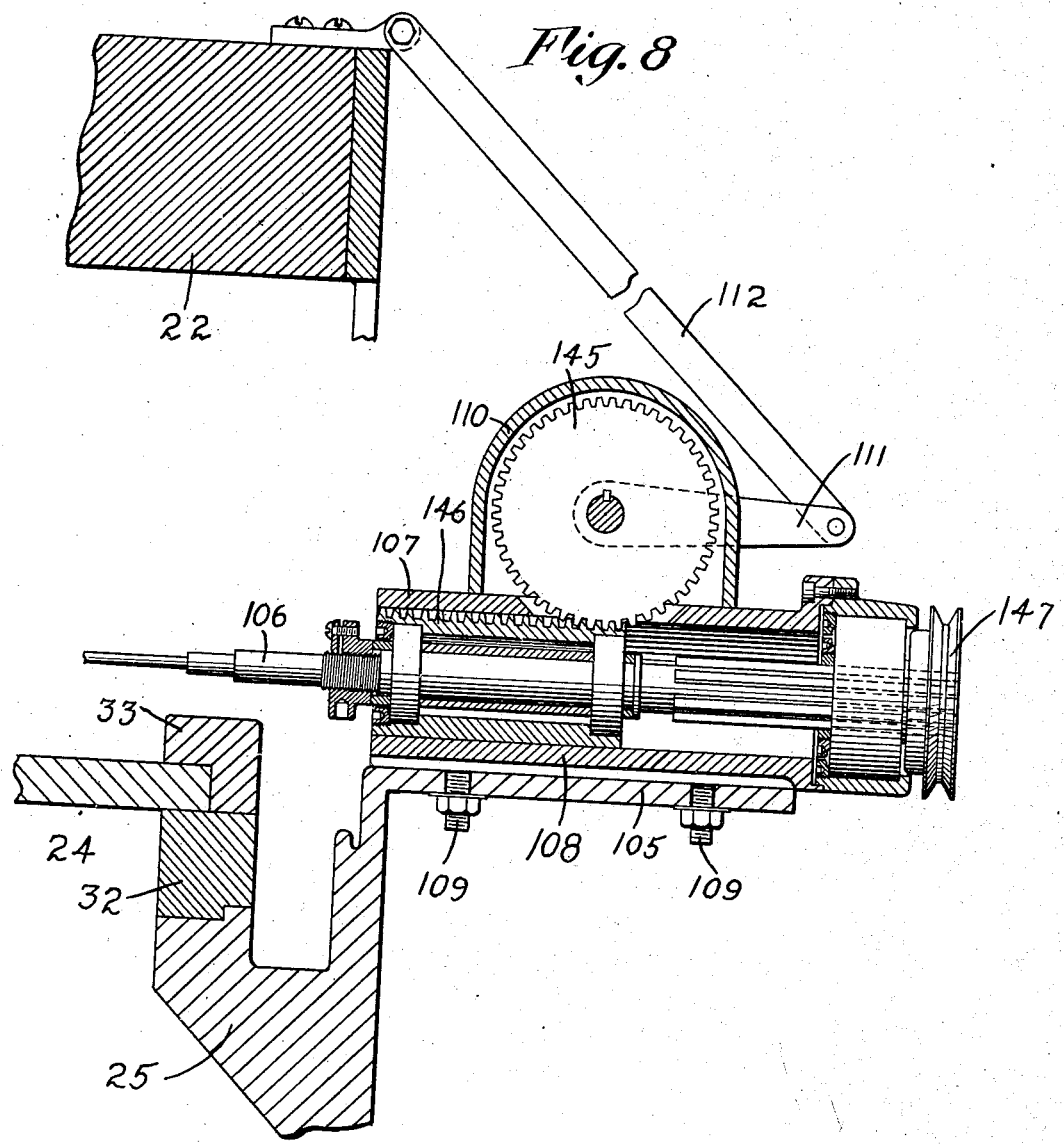
INVENTOR
Alfred J. Noel
BY Johnson, Kline and Smyth
ATTORNEYS Patented May 11, 1943

2,318,619

UNITED STATES PATENT OFFICE 2,318,619

MULTIPLE SPINDLE DRILL PRESS

Alfred J. Noel, Stratford, Conn., assignor to The Bodine Corporation, Bridgeport, Conn., a corporation of Connecticut Application August 1, 1940, Serial No. 349,144

28 Claims. (Cl. 77—24)

The present invention relates to improvements in machine tools for automatically performing successive multiple operations on a piece of work, and especially drilling, and similar operations, such as reaming, countersinking, tapping, and the like.

More specifically, the present invention relates to improvements in automatic machine tools of the aforesaid type which comprise an intermittently rotated member carrying a plurality of work holders disposed at spaced angular intervals, and a plurality of tools arranged to perform successive operations on each piece of work carried by said work holders as the latter are moved into successive positions by intermittent rotation of said rotary member.

It is an object of the present invention to provide means for intermittently rotating the rotary member carrying the work holders, together with means for rotating the work holders with reference to said rotary member through a predetermined angle, operation of the better means being coordinated with the intermittent rotation of the supporting member.

Another object is the provision of means for accurately positioning or aligning said work holders with the tools after each intermittent rotation of the rotary support, and also for aligning and guiding a tool, such as a drill, toward the piece of work during the machining operation.

A further object is the provision of means for ejecting the work from each work holder after completion of the successive machining operations thereon in order to facilitate removal of the finished work therefrom.

In general, according to the present invention, the automatic machine tool comprises a rotary table carrying a plurality of rotatably mounted work holders arranged at equally spaced angular intervals, equidistant from the axis of said table. The table is rotated intermittently by a suitable mechanism through an angle equal to that separating the successive work holders whereby the latter are successively registered with a series of tools correspondingly positioned at intervals around the axis of the table.

Suitable means is also provided for rotating the work holders relative to the said table through a predetermined angle at predetermined intervals, incidental to the intermittent rotation of the table as the latter moves the said work holders into each of their successive positions. This is preferably accomplished by the provision of stationary stop means positioned at desired intervals around said table, cooperating with cams having suitably spaced projections on the work holders for rotating the latter, and an annular guide surface normally preventing rotation of said work holders by engaging said projections in the intervals between said stop means whereby the work holders are held in approximately the desired position for operation of the tools upon the pieces of work carried thereby.

In machines provided with means for rotating work holders in conjunction with intermittent rotation of a worktable, it is difficult to arrest the rotation both of the table and of the workholders in such a manner that the work is accurately aligned with the tools, such as drills or similar devices, disposed adjacent successive work holders. Hence, in attaining the objects of the present invention, means is provided for accurately aligning the work holders with the tools after each successive operation of the rotary table with the said tool to insure accuracy in the machining operation.

This means comprises a plurality of jig plates having aligning means which engages means on the work holders for accurately positioning the latter in each of the machining positions, the said jig plates being carried by a common support which is reciprocated by a suitable mechanism coordinated with the mechanism for intermittently rotating the table. The operation of the jig plates is so timed that the work holders are released during each intermittent rotation of the table and reengaged for accurate alignment during the machining operation in each machining position.

The tools, which are suitably disposed opposite the various successive positions of rest of the said work holders, are brought into operative engagement with the work holders by means of mechanism coordinated with that which rotates the table and which engages and releases the work holders from the jig plates. Operation of the tools is so timed that they engage the work while the latter is aligned by means of the jig plates, and are retracted into inoperative position before the work holders are released by the said jig plates. The latter also serve to guide the tools accurately during the machining operation.

Preferably, a cam device is provided for partially ejecting the work from each of the work holders as the latter are moved by rotation of the table beyond the last machining position in order to facilitate manual removal of the completed work from the work holders.

Other features and advantages of the invention will appear hereinafter from the following description, referring to the accompanying drawings, which show one embodiment of the invention and in which:

Fig. 2 is a vertical cross-section of a rotary worktable including a work holder adapted to be rotated with reference to the table, and a drill jig adapted for vertical reciprocating movement.

Fig. 3 is a detail in cross-section of a work holder, showing a cam for partially ejecting work carried thereby.

Fig. 4 is a detail in cross-section of means for rotating a work holder, the latter being shown in side elevation.

Fig. 8 is an axial vertical cross-section of the horizontally disposed spindle unit shown in Fig. 5, along the line 8—8, showing the reciprocating mechanism thereof.

Figure 1:
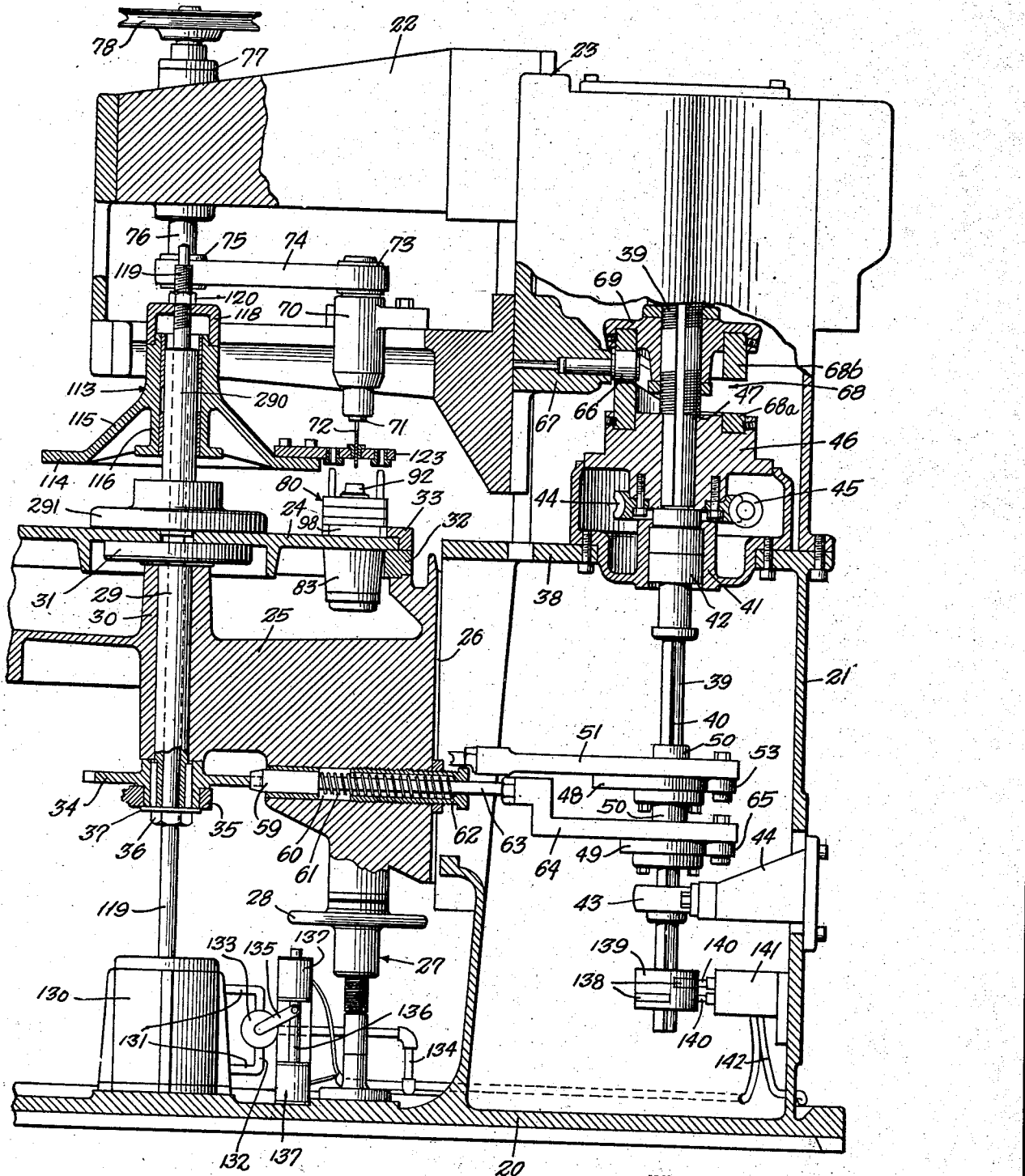
Figure 1 is a side view, partly in cross-section, of a machine tool including an aligning mechanism according to the present invention.

Referring to the drawings, the mechanism of the present invention is embodied in a multiple spindle drill press for carrying out multiple drilling and similar operations, such as reaming, countersinking and tapping on successive pieces of work.

The machine tool comprises a base 20, a hollow supporting column 21, a tool carriage 22 mounted for vertical reciprocating movement in guides 23 at the side of the upper portion of said column, and a rotary worktable 24 supported by a carriage 25 which is mounted for vertical adjustment in guides 26 at the side of the lower portion of said column. The latter carriage is vertically adjustable by means of a screw jack 27, supported on the base 20 and operated by a handwheel 28.

The worktable 24 is keyed for rotation with a hollow shaft 29 journaled in a vertical bearing 30 in the carriage 25 and supported by a hub 31, secured to said shaft and to the lower surface of the table 24, which abuts the upper end of said bearing. The outer edge of the table 24 engages an annular groove formed by an annular shoulder member 32 supported on the carriage 25 and a countersunk guide ring 33 secured to the said shoulder member. A ratchet wheel 34 is keyed to the lower end of the shaft 29 and is thus adapted to rotate the table 24. A collar 35 forming part of the pawl mechanism and adapted to turn freely on said shaft, is secured in place by a nut 36 and washer 37 below said ratchet wheel. The collar and ratchet wheel form part of a mechanism for intermittent rotation of the table 24.

The driving mechanism for intermittently rotating the table is mounted, as shown, in the hollow column 21, supported by a transverse partition 38. A shaft 39, having a keyway 40, is journaled in a bearing 41 provided with a bushing 42 and in a second bearing 43 secured by a bracket 44 to the wall of column 21. A third bearing for said shaft, not shown, may be located near the top of the column 21. A worm gear 44 secured to said shaft is driven by a worm 45 continuously rotated by suitable driving means during operation of the machine. The worm gear 44 is secured to a disk 46 which is keyed to said shaft, the said disk abutting the upper end of the bushing 42 and a shoulder 47 on the shaft 39, whereby the latter is supported against downward displacement.

A pair of cams 48 and 49 are carried one above the other by a flanged sleeve 50, keyed to the shaft 39. The said cams are adapted to operate the mechanism for intermittently rotating the table 24 through a predetermined angle for each revolution of the shaft 39.

Figure 6:
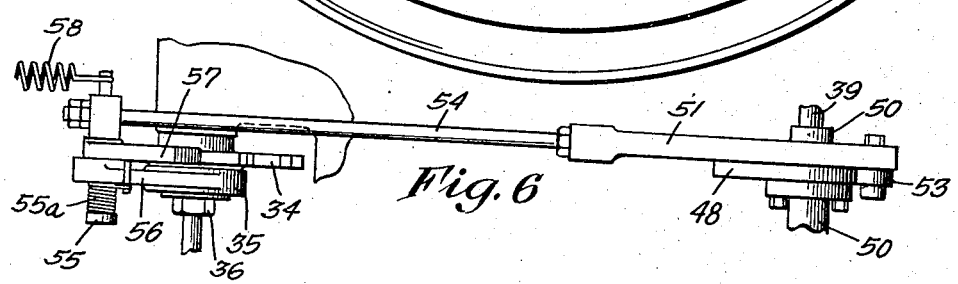
Fig. 6 is a detail in side elevation of means for intermittently rotating the worktable comprising a pawl and ratchet operated by a cam mechanism.
Figure 7:
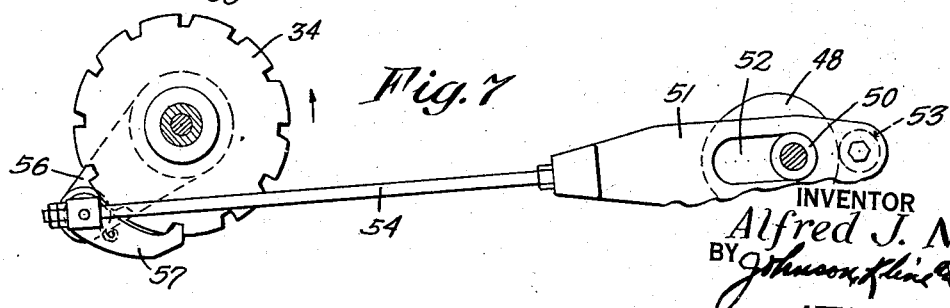
Fig. 7 is a plan elevation of the mechanism shown in Fig. 6.

A portion of the latter mechanism, comprising the pawl and ratchet which is operated by cam 48, is shown in Figs. 6 and 7. The mechanism comprises a link 51 engaging the sleeve 50 by means of a longitudinal slot 52 which permits limited lengthwise motion of said link relative to said sleeve. A cam follower 53 secured to the end of said link engages the operating surface of the cam 48.

The link 51 is connected by a rod 54 to a pin 55 attached to the end of the lever 56 which is integral with the collar 35. Pin 55 also carries a pawl 57 normally urged into engagement with the ratchet wheel 34 by a coil spring 55a. A spring 58 exerts a force on the rod 54, whereby the link 51 is normally urged into the initial operating position shown in Fig. 7.

During a part of each revolution of the shaft 39 and cam 48, cam follower 53 is displaced to the right, causing the pawl 57 to move the ratchet wheel 34 through an angle equal to the distance between two adjacent notches on said wheel. The cam then releases said cam follower permitting the pawl to return to its initial position in which it engages the next notch on the said ratchet wheel.

In order to retain the ratchet wheel 34 and the associated table 24 positively in each successive position, a stop means is provided which is best shown in Fig. 1, operated by the cam 49. The said stop means comprises a plunger 59 carried in a horizontal guide passage 60 in the carriage 25, and normally urged by spring 61, which seats against the spring cup 62, to a position engaging a notch of the ratchet wheel 34. The said plunger is operated by a rod 63 connected to a link 64 carrying a cam follower 65 which engages cam 49, in the same manner as the link 51 and cam follower 53 which operate the pawl and ratchet mechanism. Simultaneous rotation of cams 48 and 49 coordinates the operation of the stop mechanism and the pawl and ratchet mechanism so that the plunger 59 is retracted to release the ratchet wheel 34 just before operation of the pawl mechanism by cam 48. The plunger is then released by cam 49 before the operation of the pawl and ratchet mechanism is complete and thus halts motion of the ratchet wheel as the succeeding notch thereof reaches a position opposite the said plunger. As hereinbefore set forth, the table 24 is rotated by the ratchet wheel 34, and is thus operated by the aforesaid cam-controlled mechanism so as to be intermittently moved through equal angular increments for each revolution of the shaft 39. The sleeve 50 and the cams 48 and 49 are adapted to slide vertically on the shaft 39 to permit vertical adjustment of the carriage 25.

Means for raising and lowering tool carriage 22 in timed relation with the intermittent rotation of the table 24 also comprises a mechanism operated by the shaft 39. The latter mechanism is adapted to retain the said tool carriage in raised position during each rotation of the table 24 and to lower the said carriage for operation of the tools after each rotary movement of said table is completed. The mechanism, whereby this is accomplished, comprises a cam follower 66 carried by an arm 67 integrally secured to the carriage 22, and engaging a cylindrical cam 68 comprising a lower section 68a carried by the disk 46 and an upper section 68b which is secured to the shaft 39 by means of a flanged disk 69. The cam 68 is adapted to raise the carriage 22 during a portion of each revolution of the shaft 39 and to lower it to position for operation of the tools during the remaining part of the revolution of said shaft.

The tool carriage 22 supports a plurality of vertically arranged spindles carrying tools such as drills, one of which is shown in Fig. 1, by way of illustration, comprising a bearing sleeve 70, a spindle 71, a drill 72, mounted in said spindle, and a pulley 73 for rotating said spindle. The pulley 73 is driven by a belt 74 attached to a pulley 75 carried by a drive shaft 76, journaled in a bearing 77 in the upper part of the carriage 22. A pulley 78 on the opposite end of said drive shaft provides means for connecting the latter to a suitable driving motor. A number of horizontal spindles may also be provided, and connected as hereinafter described, for reciprocation with the carriage 22.

A plurality of work holders 80 are arranged at equally spaced angular intervals on the table 24, their axes being equidistant from the axis of the table and parallel thereto. The angular spacing of said work holders corresponds to the angular intervals between successive notches in ratchet wheel 34. Thus, as the table 24 is intermittently rotated through equal angular increments by said ratchet wheel and the associated mechanism, each work holder is successively brought into the position formerly occupied by the preceding work holder when the table comes to rest.

Each of the work holders 80 is mounted for rotation about a vertical axis relative to the table 24. For this purpose, each work holder comprises a sleeve 81 having an outwardly extending flange 82 at its upper end. Sleeve 81 is carried in a vertical bearing 83, integral with the table 24 and provided with antifriction bushings 84. At its lower end, the sleeve 81 carries a threaded lock ring 81a which abuts the lower end of the bearing 83 and retains said sleeve in engagement with the said bearing. The flange 82 is secured to a cam 98, hereinafter described, which is supported on the surface of the table 24 at the upper end of the bearing 83.

A second flanged sleeve 85 fits into the sleeve 81, a flange 85a on the upper end of the sleeve 85 engaging the upper surface of the flange 82, and a lock ring 86 secured to the lower end of the sleeve 85 engages the lower end of the sleeve 81.

A pair of vertical aligning pins 88 extend upward on opposite sides of the flange 82, through apertures in the flange 85a thus preventing relative rotation of the sleeves 81 and 85. A correspondingly apertured cover plate 89 is also carried by pins 88 and supported by flange 85a. A socket member 90 disposed in the upper part of the bore of the sleeve 85 is keyed to said sleeve, by means of key 90a carried in flange 85a and engaging a groove 90b in said socket member parallel to its axis. Socket member 90 is normally supported on a shoulder 91 in the interior of the bore of said sleeve. A piece of work 92 to be machined is carried in the socket of said socket member and in a central aperture provided in the cover plate 89. The socket member 90 may also include a centering pin 93 to center the work 92. Means for partially ejecting the workpiece, when the machining operations thereon are completed, comprises a rod 94 secured to the lower surface of the socket member 90 and carrying a plunger 95 on its lower end. A spring 96 seated against shoulder 91 normally urges the plunger 95 downward, causing the socket member 90 to seat against the upper surface of said shoulder. A vertical roller 97a carried at the lower end of the plunger 95 is adapted to ride up over an arcuate cam surface 97 provided on a depending flange, integral with member 32, below the center line of the work holders 80. As each work holder 80 is rotated by the table 24 beyond the position in which the final machining operation occurs, the roller 97a engages the said cam surface 97 raising the socket member 90 against the compressive resistance of the spring 96, and partly ejecting the workpiece 92, thereby facilitating its manual removal from the work holder. Cooperation of key 90a with groove 90b permits vertical ejecting movement of socket member 90, but prevents casual rotation thereof relative to sleeve 85 which might result in rotative displacement of the work piece in the socket.

Indexing means for rotating the work holders 80 about their vertical axes relative to the table 24 at predetermined intervals during the rotation of said table comprises a star-shaped cam 98 secured to the sleeve 81 below the flange 82 of each work holder. The adjacent tips of the said cam are adapted to engage the annular surface of the guide ring 33, normally preventing rotation of said work holders with reference to the table 24. At predetermined intervals on said guide ring stop means is provided between successive positions of rest of said work holders to engage the forwardly extended tip of cam 98, causing the work holder 80 to rotate through an angle which is determined by the angular spacing of the adjacent tips on the said cam.

Figure 5:
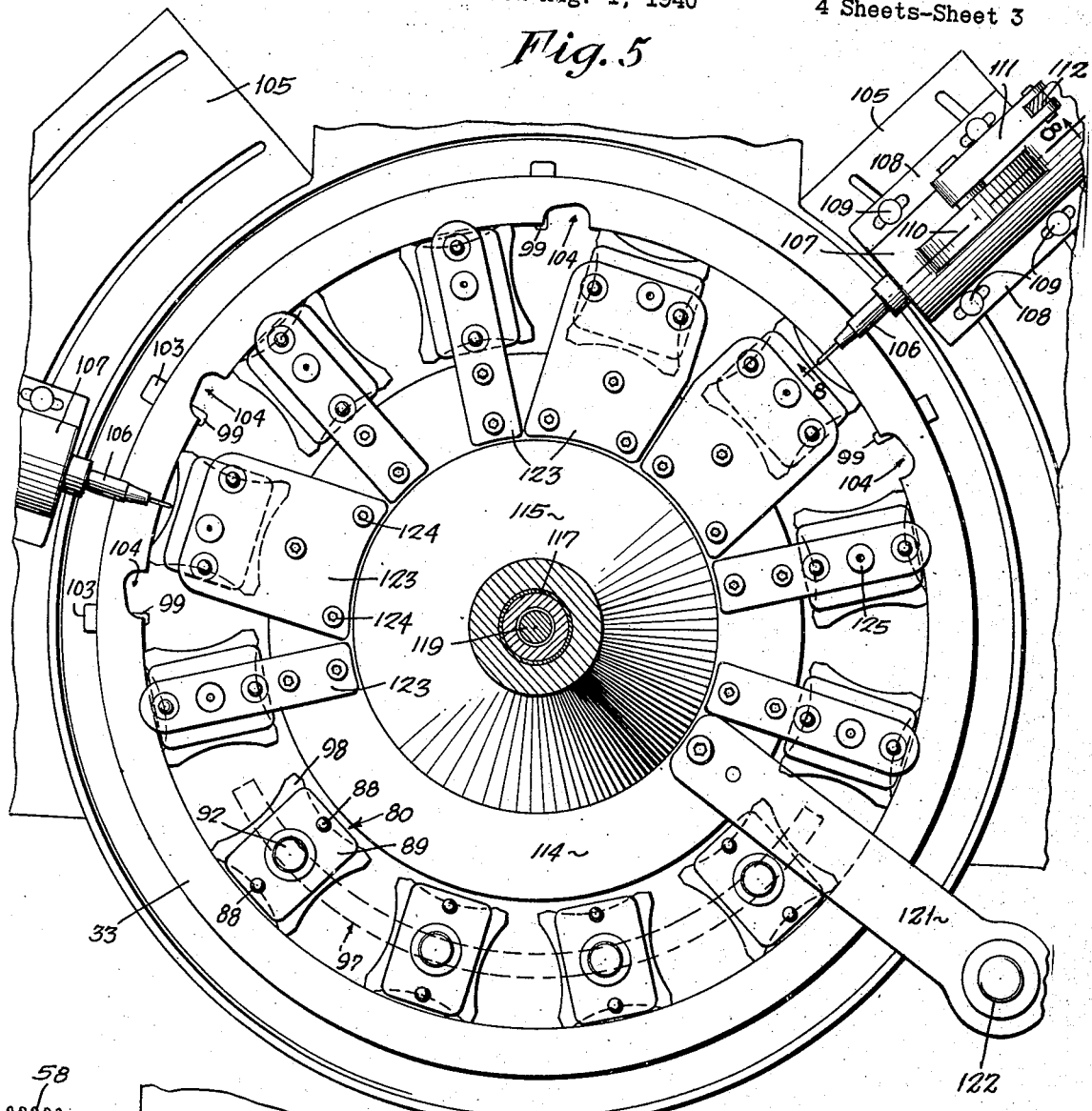
Fig. 5 is a plan view, taken on line 5—5 of Fig. 2, of the rotary worktable carrying a plurality of work holders, and a jig support positioned above said table carrying a plurality of jig plates, said view including a horizontally disposed drill or spindle unit.

The said stop means for rotating the work holders is shown in Figs. 4 and 5, and comprises a plunger 99 protruding radially inward from the annular guide surface of the ring 33. The plunger 99 is carried in a radial passage 100, and is normally urged into projected position by spring 101. A flange 102 on the inner end of said plunger seats against a shoulder in said passage for limiting the outward movement of the plunger 99. The spring 101 is supported at the rear end of the passage 100 by a threaded plug 103.

A recess 104 adjacent said plunger in the guide surface of the ring 33 is provided to permit rotation of the tip of each cam 98 as it engages the plunger 99 during rotation of the table 24. As the succeeding tip of the said cam engages the surface of the ring 33 arresting the rotation of the work holder, plunger 99 is depressed by the engaged tip, allowing the latter to pass over the plunger.

Cams 98 are shown as having four tips adapted to rotate the work holders 80 through an angle of 90° each time a plunger 99 is engaged. However, by varying the angular spacing of the tips of the said cams, the work holders 80 may be caused to rotate through a greater or lesser angle.

The spindles carrying drilling tools are adjustably secured in successive positions to the carriage 22 in such a manner as to be in the desired position above each of the work holders as the latter come to rest after each intermittent rotation of the table 24.

If desired, additional spindles carrying drilling tools, as shown in Figs. 5 and 8, may be arranged on arcuate supports 105, surrounding the table 24, for horizontal drilling operations on the work held by the work holders. The latter spindles and tools may comprise a spindle 106 carried in a bearing sleeve 107 adjustably secured by flanges 108 and bolts 109 to the supports 105. A gear 145 engaging a rack 146 for imparting axial motion to the spindle 106 may be housed in a portion 110 of the sleeve 107. The said spindle may be driven by a suitably disposed motor which may be arranged, for instance, to drive pulley 147 by means of a belt, and a lever 111, secured by a link 112 to the vertically reciprocated carriage 22, may impart reciprocating axial motion to the said spindle, coordinated with the motion of the vertical spindles supported by the said carriage.

Aligning means is provided, according to the present invention, which engages the work holders 80 after they have been positioned opposite each of the spindles following each successive rotary movement of the table 24, for accurately positioning the said work holders to insure accuracy in the machining operation. This means comprises a jig support 113 having a peripheral horizontal flange 114 integral with a conical skirt 115, which has a sleeve 116, mounted for sliding movement on an axially aligned hollow shaft 290 secured to the top of the table 24 by a hub 291 and provided with antifriction bushings 117 to facilitate the said sliding motion.

A head 118 secured to said sleeve 116 is carried by a rod 119 extending vertically through the hollow shafts 29 and 290. The jig support 113 is threaded to said shaft for vertical adjustment, and is provided with a lock nut 120 for retaining it at the desired height.

A radial arm 121 is secured to the flange 114 and is provided at its outer end with means 122 for retaining it against lateral displacement, thus preventing rotation of the jig support 113 and the shaft 119.

A plurality of jig plates 123 are secured to the flange 114 of the jig support 113 by means of bolts 124, each of said jig plates extending over a work holder 80 positioned opposite one of the spindles. Each jig plate is provided with a jig bushing 125 for guiding the drill or other tool carried by the vertical spindles supported by the carriage 22.

In addition, each jig plate 123 is provided with a pair of aligning bushings 126 for engaging the upwardly extending aligning pins 88 on each of the work holders 80, said bushings being located on each jig plate in conformity with the successive positions of rest which pins 88 occupy as a result of the progressive rotation of each of the work holders 80 with reference to the table 24.

The jig support 113 and associated jig plates 123 are moved vertically between limits as indicated by dotted lines in Fig. 2, the said movement being coordinated with the intermittent rotation of the table 24 and the reciprocating motion of the tool carriage 22. Namely, the jig plates 123 are raised to release the pins 88 of the work holders 80 during each arcuate rotation of the table 24. After the said table comes to rest with the work holders in the succeeding positions, the jig support and jig plates are lowered, aligning bushings 126 engaging pins 88 on each of the said work holders and thus rigidly and accurately aligning each piece of work for the operation of the tools. The spindle carriage 22 is then lowered, and the tools associated therewith operate upon the various pieces of work carried by the work holders. Jig bushings 125, in each case, guide the drills or other tools disposed above the worktable into accurate engagement with the workpieces. When the machining operation is complete, the tool carriage 22 is raised, withdrawing the tools from the jig plates. The jig support 113 and the jig plates 123 are then raised, releasing the pins 88 of each work holder; the table 24 is rotated through the desired angle, and the operation is repeated.

As will be readily understood, each workpiece 92 is inserted into a work holder 80 before the latter reaches the position for the first machining operation, and is manually removed therefrom after the work holder passes beyond the position corresponding to the last machining operation. The removal of the workpiece is facilitated by operation of the automatic partial ejection device hereinbefore described.

Means for effecting reciprocating vertical motion of the jig support 113 and jig plates 123, coordinated with the intermittent rotation of the table 24 and operation of the tool carriage 22 may be of any kind known in the art. It may include mechanical, electrical, or fluid pressure means suitably controlled in timed relation with the operation of the worktable 24 and the tool carriage 22, by means of the mechanism operating the latter members.

One form of such a control mechanism, shown in Fig. 1, comprises a cylinder 130 secured to the base 20 and housing a piston secured to the lower end of the rod 119. A pair of compressed air inlets 131 are disposed at opposite ends of the cylinder and are connected by pressure lines 132 to a valve 133. A compressed air line 134 leads from a supply station to the said valve.

The valve 133 is operated by lever 135 to admit compressed air alternately to either end of the cylinder while releasing air from the opposite end to the atmosphere. Thus, the said piston is adapted alternately to raise and lower the jig support 113 in response to operation of the valve 133. Lever 135 is moved respectively to either operating position by an armature 136 controlled by a pair of solenoids 137, energization of one solenoid moving the lever to one position, and energization of the other solenoid, to the opposite position.

The said solenoids are alternately energized in timed relation with the mechanism for rotating the table 24 by means of a pair of arcuate contacts 138 carried by a contact drum 139 secured to the lower end of the shaft 39, the said contacts cooperating with pairs of fixed brushes 140 carried by a bracket 141 secured to the inner wall of the column 21. A power lead 142 connects one of each pair of brushes 140 to a source of electric power. By suitable disposition of the arcuate contacts 138, the solenoids 137 are alternately energized to operate the valve 133 so that the jig support 113 and jig plates 123 are alternately raised and lowered by the compressed air in the said cylinder, in the desired timed relation with the intermittent rotary motion of the table 24 and with the reciprocating motion of the tool carriage 22, for each revolution of the shaft 39.

It will be readily understood that numerous variations may be made in the aligning mechanism for aligning the work with the tools in a multiple spindle drill press and in the control mechanism of the present invention. For instance, other suitable mechanisms may be substituted for the described ratchet and stop means for interrupting the motion of the table 24 Means for rotating the work holders with reference to the table at predetermined intervals may also be varied. Likewise, other means may be provided for raising and lowering the tool carriage, and the coordination of the various operations of the machine may be accomplished by any means within the knowledge of those skilled in the art.

Variations and modifications may be made within the scope of this invention and portions of the improvements may be used without others.

I claim:

1. In a multiple spindle drill press having a series of tool-carrying spindles, an intermittently operated rotary member; a plurality of work holders carried by said member; intermittent rotation of said member moving said work holders progressively into successive positions opposite said series of tool-carrying spindles; automatic reciprocating means for moving said spindles into position for operation of the tools carried thereby upon the work carried by said work holders after completion of each intermittent rotary movement of said rotary member, and for retracting said spindles prior to the succeeding rotary movement of said member; means for aligning said work holders with said spindles comprising means for engaging said work holders in each of said successive positions and for rigidly retaining them against displacement during said engagement; and automatic means operated in timed relation with said spindle-reciprocating means for moving said aligning means in work-holder-engaging direction in advance of corresponding movement of said spindles in work-engaging direction, said aligning means engaging said work holders during ensuing operation of the tools, and for releasing said work holders from said aligning means after said operation of the tools prior to the succeeding rotary movement of said rotary member.

2. In a multiple spindle drill press, an intermittently rotated member; a plurality of work holders carried by said member, intermittent rotation of said member moving each of said work holders into successive positions opposite a series of tool-carrying spindles; automatic reciprocating means for moving said spindles into position for operation of the tools carried thereby upon the work carried by said work holders after completion of each intermittent rotary movement of said rotary member, and for retracting said spindles prior to the succeeding rotary movement of said member; means for aligning said work holders with said spindles comprising means for rigidly retaining said work holders against displacement in each of said tool-engaging positions during operation of the tools and for releasing said work holders before each intermittent rotation of said rotary member; and common means for actuating said rotary member and said aligning means in timed relation.

3. In a multiple spindle drill press, an intermittently rotated member; a plurality of work holders carried by said member, intermittent rotation of said member moving each of said work holders into successive positions opposite a series of tool-carrying spindles; reciprocating means for moving said spindles into position for operation of the tools carried thereby upon the work carried by said work holders after completion of each intermittent rotary movement of said rotary member and for retracting said spindles prior to the succeeding rotary movement of said member; means for aligning said work holders with said spindles comprising means for rigidly retaining said work holders against displacement in each of said tool-engaging positions during operation of the tools, the latter means releasing said work holders for intermittent rotation with said rotary member; and common means for actuating said rotary member, said aligning means and said spindle-reciprocating means in timed relation.

4. In a multiple spindle drill press, an automatically operated, intermittently rotated member; a plurality of work holders carried by said member and mounted for rotation relative thereto, intermittent rotation of said member moving each of said work holders into successive positions opposite a series of tool-carrying spindles; automatic reciprocating means for moving said spindles into position for operation of the tools carried thereby upon the work carried by said work holders after completion of each intermittent rotary movement of said member, and for retracting said spindles prior to the succeeding rotary movement of said member; automatic means for rotating each of said work holders through a predetermined angle relative to said rotary member at predetermined intervals in their circuits; and automatic means for aligning said work holders with said spindles comprising means for rigidly retaining said work holders against displacement in each of said tool-engaging positions during operation of the tools, and for releasing said work holders before each intermittent rotation of said rotary member.

5. In a multiple spindle drill press, an intermittently rotated member; a plurality of work holders carried by said member and mounted for rotation relative thereto, intermittent rotation of said member moving each of said work holders into successive positions opposite a series of tool-carrying spindles; reciprocating means for moving said spindles into position for operation of the tools carried thereby upon the work carried by said work holders after completion of each intermittent rotary movement of said member, and for retracting said spindles prior to the suceeding rotary movement of said member; automatic means for rotating each of said work holders through a predetermined angle relative to said rotary member at predetermined intervals in their circuit; means for aligning said work holders with said spindles comprising means for rigidly retaining said work holders against displacement in each of said tool-engaging positions during operation of the tools and for releasing said work holders before each intermittent rotation of said rotary member; and common means for actuating said rotary member, said aligning means, and said spindle reciprocating means in timed relation.

6. In a multiple spindle drill press, an intermittently rotated member; a plurality of work holders carried by said member and mounted for rotation relative thereto, intermittent rotation of said member moving each of said work holders into successive positions opposite a series of tool-carrying spindles; reciprocation means for moving said spindles into a position for operation of the tools carried thereby upon the work carried by said work holder after completion of each intermittent rotary movement of said member, and for retracting said spindles prior to the succeeding rotary movement of said member; means operated by rotation of said intermittently rotated member for rotating each of said work holders through a predetermined angle relative to said rotary member at predetermined intervals in their circuit; means for aligning said work holders with said spindles comprising means for rigidly retaining said work holders against displacement in each of said tool-engaging positions during operation of the tools, and for releasing said work holders before each intermittent rotation of said rotary member; and common means for actuating said rotary member, said aligning means, and said spindle-reciprocating means in timed relation.

7. In a multiple spindle drill press, an automatically operated, intermittently rotated member; a plurality of work holders carried by said member and mounted for rotation around axes parallel to the axis of rotation of said member, intermittent rotation of the latter moving each of said work holders into successive positions opposite a series of tool-carrying spindles; automatic reciprocating means for moving said spindles into position for operation of the tools carried thereby upon the work carried by said work holders after completion of each intermittent rotary movement of said member, and for retracting said spindles prior to the succeeding rotary movement of said member; automatic means for rotating each of said work holders through a predetermined angle relative to said rotary member at predetermined intervals in their circuit; means for aligning said work holders with said spindles comprising a plurality of aligning members having physical alterations adapted to engage portions of said work holders and to retain the latter rigidly against displacement in each of said tool-engaging positions during operation of the tools; and automatic means for engaging said aligning members with said work holders before operation of the tools thereon and for disengaging said work holders therefrom before each intermittent rotation of said rotary member.

8. In a multiple spindle drill press, an automatically operated, intermittently rotated member; a plurality of work holders carried by said member and mounted for rotation around axes parallel to the axis of rotation of said member, intermittent rotation of the latter moving each of said work holders into successive positions opposite a series of tool-carrying spindles; automatic reciprocating means for moving said spindles into position for operation of the tools carried thereby upon the work carried by said work holders after completion of each intermittent rotary movement of said member, and for retracting said spindles prior to the succeeding rotary movement of said member; automatic means for rotating each of said work holders through a predetermined angle relative to said rotary member at predetermined intervals in their circuit; means for aligning said work holders with said spindles and for guiding said tools into accurate engagement with pieces of work carried by said work holders comprising a plurality of aligning members having physical alterations adapted to engage portions of said work holders for retaining the latter rigidly against displacement in each of said tool-engaging positions during operation of the tools and also having guiding means for engaging each of said tools; and automatic means for engaging said aligning members with said work holders before operation of the tools on the said workpieces and for disengaging said work holders therefrom before each intermittent rotation of said rotary member.

9. In a multiple spindle drill press, a horizontal worktable intermittently rotated by automatic means about a vertical axis; a series of tool-carrying spindles disposed above said worktable; a plurality of work holders carried by said worktable arranged in a circle at equally spaced angular intervals and mounted for rotation about vertical axes relative to said table; automatic vertical axes relative to said table; automatic reciprocating means for moving said spindles into a position for operation of the tools carried thereby upon the work carried by said work holders after completion of each intermittent rotary movement of said worktable and for retracting said spindles prior to the succeeding rotary movement of said table; automatic means for rotating each of said work holders through a predetermined angle relative to said worktable at predetermined intervals in their circuit; and means for aligning said work holders with said spindles comprising a plurality of jigs adapted to engage pins projecting from said work holders, and means for engaging the said jigs with said pins when the work holders are in each of said tool-engaging positions whereby said work holders are rigidly retained against displacement during operation of the tools upon the pieces of work carried thereby and for releasing said work holders from said jigs before each intermittent rotation of said worktable.

10. In a multiple spindle drill press, a horizontal worktable intermittently rotated by automatic means about its vertical axis; a series of tool-carrying spindles disposed above said worktable; a plurality of work holders carried by said worktable arranged in a circle at equally spaced angular intervals and mounted for rotation about vertical axis, relative to said table; automatic reciprocating means for moving said spindles into a position for operation of the tools carried thereby upon the work carried by said work holders after completion of each intermittent rotary movement of said worktable and for retracting said spindles prior to the succeeding rotary movement of said worktable; means for rotating each of said work holders through a predetermined angle relative to said worktable at predetermined intervals in their circuit; and means for aligning said work holders with said spindles comprising a plurality of jigs adapted to engage pins projecting vertically from said work holders; automatic reciprocating means for moving said jigs vertically for engaging said pins when the work holders are positioned in each of said tool-engaging positions during operation of the tools, and for releasing said work holders from said jigs before each intermittent rotation of said worktable.

11. In a multiple spindle drill press, a horizontal worktable intermittently rotated by automatic means about its vertical axis; a series of tool-carrying spindles disposed above said worktable; a series of tool-carrying spindles laterally disposed adjacent the periphery of said worktable; a plurality of workholders carried by said worktable arranged in a circle at equally spaced angular intervals and mounted for rotation about vertical axes relative to said table; automatic reciprocating means for moving both of said series of spindles into position for operation of the tools carried thereby upon the work carried by said work holders after completion of each intermittent rotary movement of said worktable, and for retracting said spindles prior to the succeeding rotary movement of said worktable; means operated by rotation of said intermittently rotated worktable for rotating each of said work holders through a predetermined angle relative to said rotary worktable at predetermined intervals in their circuit; means for aligning said work holders with said spindles and for guiding the tools carried by the series of spindles disposed above said worktable, comprising a plurality of jigs adapted to engage pins projecting vertically upward from said work holders, and carrying jig bushings for engaging the tools carried by said series of spindles; and automatic means for engaging said jigs with said pins in each of said tool-engaging positions whereby the work holders are rigidly retained against displacement during operation of the tools, and for releasing said work holders before each intermittent rotation of said worktable.

12. In a multiple spindle drill press, an automatically operated, intermittently rotated member; a plurality of work holders carried by said member and mounted for rotation relative thereto, intermittent rotation of said member moving each of said work holders into successive positions opposite a series of tool-carrying spindles; automatic reciprocating means for moving said spindles into a position for operation of the tools carried thereby upon the work carried by said work holders after completion of each intermittent rotary movement of said member, and for retracting said spindles prior to the succeeding rotary movement of said member; means for automatically rotating each of said work holders through a predetermined angle relative to said rotary member at predetermined intervals in their circuit comprising stop means disposed around said rotary member, and means on each of said work holders for engaging said stop means at predetermined intervals during rotation of said member; and means for aligning said work holders with said spindles and rigidly retaining said work holders against displacement in each of said tool-engaging positions during operation of the tools upon the work held by said work holders.

13. In a multiple spindle drill press, an automatically operated, intermittently rotated member; a plurality of work holders carried by said member and mounted for rotation relative thereto, intermittent rotation of said member moving each of said work holders into successive positions opposite a series of tool-carrying spindles; automatic reciprocating means for moving said spindles into a position for operation of the tools carried thereby upon the work carried by said work holders after completion of each intermittent rotary movement of said member, and for retracting said spindles prior to the succeeding rotary movement of said member; means for rotating each of said work holders through a predetermined angle relative to said rotary member at predetermined intervals in their circuit comprising a cam carried by each of said work holders, an annular guide surface for normally engaging said cams to prevent rotation of said work holders relative to said rotary member, stop means at predetermined intervals around said rotary member for engaging said cams to rotate said work holders through a predetermined angle with reference to said rotary member, and correspondingly disposed recesses in said annular guide member permitting rotation of said cams and work holders by said stop means; and means for aligning said work holders with said spindles and rigidly retaining said work holders against displacement in each of said tool-engaging positions during operation of the tools upon the work held by said work holders.

14. In a multiple spindle drill press, an automatically operated, intermittently rotated member; a plurality of work holders carried by said member and mounted for rotation relative to said member around axes parallel to the axis of rotation of said member, intermittent rotation of said member moving each of said work holders into successive positions opposite a series of tool-carrying spindles; automatic reciprocating means for moving said spindles into a position for operation of the tools carried thereby upon the work carried by said work holders after completion of each intermittent rotary movement of said member, and for retracting said spindles prior to the succeeding rotary movement of said member; means for rotating each of said work holders through a predetermined angle relative to said rotary member at predetermined intervals in their circuit, a star-shaped cam carried by each of said work holders, an annular guide surface normally engaging said cams for preventing rotation of said work holders relative to said rotary member, stop means at predetermined intervals around said rotary member for engaging said cams to rotate said work holders through a predetermined angle with reference to said rotary member, and correspondingly disposed recesses in said annular guide member permitting rotation of said cams and work holders by said stop means; and means for aligning said work holders with said spindles and rigidly retaining said work holders against displacement in each of said tool-engaging positions during operation of the tools upon the work held by said work holders.

15. In a multiple spindle drill press, an automatically operated, intermittently rotated member; a plurality of work holders carried by said member and mounted for rotation relative to said member around axes parallel to the axis of rotation of said member, intermittent rotation of said member moving each of said work holders into successive positions opposite a series of tool-carrying spindles; automatic reciprocating means for moving said spindles into a position for operation of the tools carried thereby upon the work carried by said work holders after completion of each intermittent rotary movement of said member, and for retracting said spindles prior to the succeeding rotary movement of said member; means for rotating each of said work holders through a predetermined angle relative to said rotary member at predetermined intervals in their circuit, comprising a star-shaped cam carried by each of said work holders, an annular guide surface normally engaging said cams for preventing rotation of said work holders relative to said rotary member, resiliently retractable stop means disposed at predetermined intervals around said rotary member and projecting from said guide surface for engaging said cams to rotate said work holders through a predetermined angle with reference to said rotary member, and correspondingly disposed recesses in said annular guide member permitting rotation of said cams and work holders by said stop means; and means for aligning said work holders with said spindles and retaining said work holders against displacement in each of said tool-engaging positions during operation of the tools upon the work held by said work ho.ders.

16. In a multiple spindle drill press comprising an automatically operated, intermittently rotated member, a plurality of work holders carried by said member, intermittent rotation of said member moving each of said work holders into successive positions opposite a series of tool-carrying spindles; automatic reciprocating means for moving said spindles into position for operation of the tools carried thereby upon the work carried by said work holders after completion of each intermittent rotary movement of said member, and for retracting said spindles prior to the succeeding rotary movement of said member; and positive ejecting means for partially ejecting the pieces of work carried by said work holders from each of said work holders, automatically operated by rotation of said rotary member after said work holder is moved beyond the last of said series of spindles.

17. In a multiple spindle drill press, an automatically operated, intermittently rotated member; a plurality of work holders carried by said member, each work holder including a socket for receiving a piece of work, intermittent rotation of said member moving each of said work holders into successive positions opposite a series of tool-carrying spindles; automatic reciprocating means for moving said spindles into position for operation of the tools carried thereby upon the work carried by said work holders after completion of each intermittent rotary movement of said member and for retracting said spindles prior to the succeeding rotary movement of said member; and means for partially ejecting the pieces of work carried by said work holders from each of the latter, comprising a plunger disposed below the socket in each work holder, and an arcuate cam surface for raising said plunger in each work holder as the latter is moved beyond the last of said series of spindles.

18. In a multiple spindle drill press, an automatically operated, intermittently rotated member; a plurality of work holders carried by said member, each work holder comprising a socket member for receiving a piece of work and means for retaining said piece of work against rotation in said socket, intermittent rotation of said member moving each of said work holders into successive positions opposite a series of tool-carrying spindles; automatic reciprocating means for moving said spindles into position for operation of the tools carried thereby upon the work carried by said work holders after completion of each intermittent rotary movement of said member, and for retracting said spindles prior to the succeeding rotary movement of said member; and means for partially ejecting the pieces of work carried by said work holders from each of the latter comprising a plunger disposed below the socket in each work holder and an arcuate cam surface for raising said plunger in each work holder as the latter is moved beyond the last of said series of spindles.

19. In a multiple spindle drill press, an automatically operated, intermittently rotated member; a plurality of work holders carried by said member, each work holder comprising a socket member for receiving a piece of work and means for retaining said piece of work against rotation in said socket, intermittent rotation of said rotary member moving each of said work holders into successive positions opposite a series of tool-carrying spindles; reciprocating means for moving said spindles into position for operation of the tools carried thereby upon the work carried by said work holders after completion of each intermittent rotary movement of said member, and for retracting said spindles prior to the succeeding rotary movement of said member; means for partially ejecting the pieces of work carried by said work holders from each of the latter comprising a plunger disposed below the socket thereof; resilient means for normally retaining said plunger in retracted position; an arcuate cam surface for raising the plunger in each of said work holders after the latter have moved beyond the last said series of spindles; and antifriction means for facilitating passage of said plunger over said arcuate cam surface.

20. In a multiple spindle drill press having an intermittently rotated worktable carrying a series of symmetrically arranged work holders mounted for rotation relative to the worktable about similarly disposed axes, intermittent rotation of the worktable moving said work holders into successive spindle-engaging positions, means for normally retaining said work holders positively against rotation relative to said worktable during intermittent rotation thereof; and means for effecting predetermined limited rotation of said work holders relative to said worktable at selected intervals in their circuit incidental to intermittent rotary movement of the worktable.

21. In a multiple spindle drill press having an intermittently rotated worktable carrying a series of symmetrically arranged work holders mounted for rotation relative to the worktable about similarly disposed axes, intermittent rotation of the worktable moving said work holders into successive spindle-engaging positions, means for rotating said work holders at predetermined intervals in their circuit incidental to the rotation of the worktable, and for retaining them against rotation between said intervals, comprising a star wheel attached to each of said work holders; a circular cam surface normally engaging a pair of adjacent tips of each star wheel to retain it against rotation relative to the worktable; and stop means disposed at selected intervals in said cam surface for engaging the leading tips of said star wheels during intermittent rotary movement of the worktable, and rotating the succeeding tips into engagement with the cam surface incidental to intermittent rotation of the worktable, said cam surface being suitably recessed adjacent each of said stop means to permit said rotation of the star wheels.

22. In a multiple spindle drill press, a rotary worktable; a plurality of work holders rotatably carried by said worktable and symmetrically disposed around the axis of the latter; means for rotating said worktable intermittently to move said work holders into successive corresponding positions; means for rotating said work holders relative to the worktable through a limited preselected angle at intervals in the circuit of said work holders incidental to the intermittent rotary motion of the worktable; a plurality of tool-carrying spindles disposed around the axis of said table, at successive stations of said work holders, the axis of at least one of said spindles being nonparallel to the axis of a work holder positioned at the corresponding station; and means operated in timed relation with said worktable-rotating means for reciprocating the spindle to bring the respective tools into engagement with the work carried by said work holders after each intermittent rotary movement of the worktable, and to retract said spindles before the next rotary movement of said worktable.

23. In a multiple spindle drill press, a rotary worktable; a plurality of work holders rotatably carried by said worktable and symmetrically disposed around the axis of the latter; means for rotating said worktable intermittently to move said work holders into successive corresponding positions; means for rotating said work holders relative to the worktable through a limited preselected angle at intervals in the circuit of said work holders incidental to the intermittent rotary motion of the worktable; a plurality of tool-carrying spindles disposed around the axis of said table, at successive stations of said work holders, the axis of at least one of said spindles being nonparallel to the axis of a work holder positioned at the corresponding station; means operated in timed relation with said worktable-rotating means for reciprocating the spindles to bring the respective tools into engagement with the work carried by said work holders after each intermittent rotary movement of the worktable and to retract said spindles before the next rotary movement of said worktable; and locking means, operated in timed relation with said worktable-rotating means and said spindle-reciprocating means, to engage the work holders at each of the tooling stations during operation of the tools on the work carried by the work holders to retain said work holders against displacement relative to the tools, and to release said work holders before the succeeding rotation of the worktable.

24. In a drill press having a series of tool-carrying spindles, an intermittently rotated member; a plurality of work holders carried by said member, each work holder including a socket for receiving a piece of work, and intermittent rotation of said member moving said work holders progressively into successive positions opposite said series of tool-carrying spindles; automatic reciprocating means for moving said spindles into position for operation of the tools carried thereby upon the work carried by said work holders after completion of each intermittent rotary movement of said member and for retracting said spindles prior to the succeeding rotary movement of said member; and means for at least partially ejecting the pieces of work carried by said work holders from each of the latter, comprising a normally inoperative work-ejecting member disposed adjacent the socket in each work holder, and cam-operated means for positively projecting the ejecting member in work-ejecting direction in the socket of each work holder incidental to movement of the latter by said rotated member beyond the last of said series of spindles.

25. In a drill press having a series of tool-carrying spindles, means for supporting a series of work pieces for limited mutually independent movement; intermittently operated feeding means for moving said work pieces progressively into a series of successive operating stations opposite said series of tool-carrying spindles and in approximate position for operation of said tools thereon; automatic means for moving said spindles into position for operation of the tools thereof upon said work pieces after completion of each intermittent operation of said feeding means and for retracting said spindles from operating position prior to the succeeding operation of said feeding means; means for positively and accurately positioning each of said work pieces with its then-associated spindle at each of said operating stations; and automatic means operated in timed relation with said spindle-moving means for moving said positioning means toward the work piece in advance of corresponding movement of said spindles, said positioning means remaining operative throughout ensuing operation of the tools, said automatic means withdrawing said positioning means from operative position prior to the succeeding operation of said feeding means.

26. In a drill press having a series of tool-carrying spindles, means for supporting a series of work pieces for limited mutually independent movement; intermittently operated feeding means for moving said work pieces progressively into a series of successive operating stations opposite said series of tool-carrying spindles, and in approximate position for operation of said tools thereon, automatic means for moving said spindles into position for operation of the tools thereof upon said work pieces after completion of each intermittent operation of said feeding means and for retracting said spindles from operating position prior to the succeeding operation of said feeding means; means for positively and accurately positioning each of said work pieces with its then-associated spindle at each of said operating stations before operation of the tools thereon, said automatic means releasing said work pieces during the intermittent operation of said feeding means; and common means for actuating said feeding means and said positive positioning means in timed relation.

27. In a drill press having a series of tool-carrying spindles, means for supporting a series of work pieces for limited mutually independent movement; intermittently operated feeding means, intermittent operation of said means moving said work pieces progressively into a series of successive operating stations opposite said series of tool-carrying spindles and in approximate position for operation of said tools thereon; means for moving said spindles toward said work pieces after completion of each intermittent operation of said feeding means and for retracting said spindles from operating position prior to the succeeding operation of said feeding means; means for positively and accurately positioning each of said work pieces with its then-associated spindle at each of said operating stations before operation of the tools thereon, said automatic means releasing said work pieces during intermittent operation of said feeding means; and common means for actuating said feeding means, said positive positioning means, and said spindle-moving means in timed relation.

28. In a drill press having a plurality of tool-carrying spindles, a worktable; a plurality of work holders mounted in a predetermined position on the worktable for rotation thereon; means for intermittently moving the worktable to carry the work holders into predetermined positions opposite a series of said spindles; automatic means for advancing and retracting said tool-carrying spindles into and out of engagement with work in said work holders during a period of rest of said worktable; automatic means for rotating the work holders a predetermined amount on the worktable at predetermined intervals in their circuit; and automatic means for aligning the work holders with the spindles comprising means operated in timed relation with the spindles for rigidly retaining the workholders against displacement during operation of the tools and for releasing the work holders before each movement of the worktable.

ALFRED J. NOEL.